April 13, 1948.  W. E. HIMOTTU  2,439,621
FISHING LURE
Filed April 2, 1946
Fig. 1.
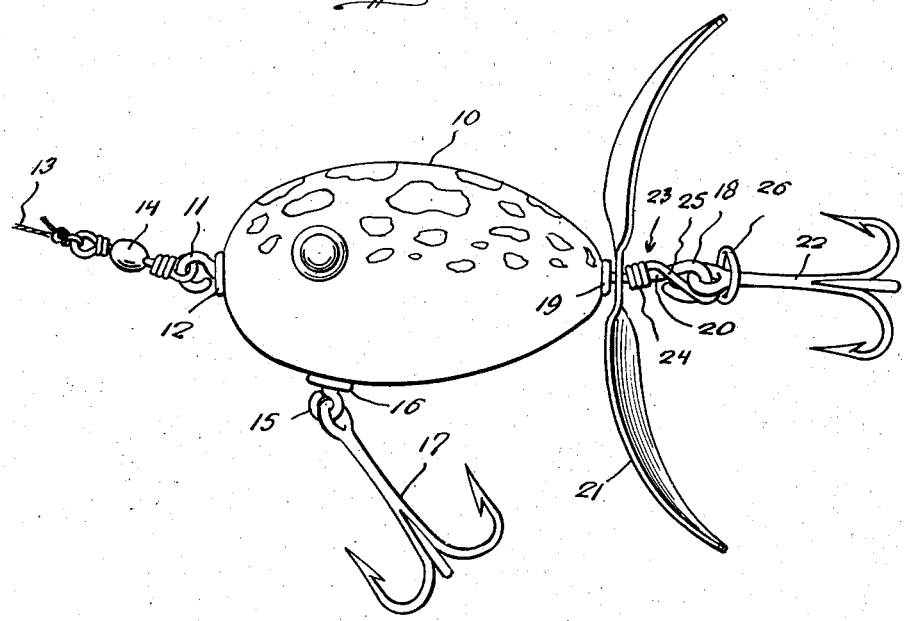
Fig. 3.
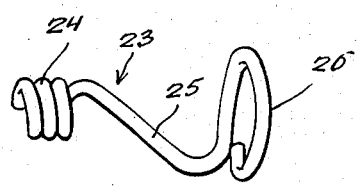
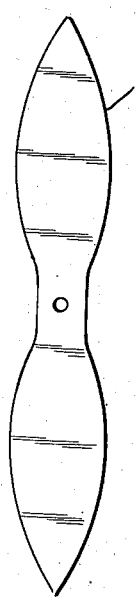
Fig. 2.
Inventor
Waino E. Himottu,
Attorneys Patented Apr. 13, 1948

2,439,621

UNITED STATES PATENT OFFICE 2,439,621

FISHING LURE

Waino E. Himottu, Gardner, Mass.

Application April 2, 1946, Serial No. 658,949

1 Claim. (Cl. 43—47)

My invention relates to fishing lures and more particularly to that kind of fishing lure commonly known by the name of spinners.

The object of my invention is to provide a fish lure which is adapted to cause a commotion on the surface of the water to attract fishes feeding at the surface of the water from a great distance.

Another object of the invention is to provide a fishing lure having a hook underneath its wooden body adjacent its front end, a spinner on its rear end which spins when the lure is pulled through the water, a second hook on the rear end of the body and behind the spinner, and a guard to prevent the second hook from being caught on the spinner.

Other objects of my invention may appear in the following specification describing my invention with reference to the accompanying drawing illustrating a preferred embodiment thereof. It is, however, to be understod that my invention is not to be limited or restricted to the exact construction and combination of parts described in the specification and shown in the drawing, but that such changes and modifications can be made which fall within the scope of the claim appended hereto.

In the drawing:

Figure 1 is a side view of the fishing lure according to my invention.

Figure 2 is a blank from which the spinner on the lure according to my invention is made, and Figure 3 is a guard adapted to prevent the rear fish hook from being caught on the spinner.

Referring now in detail to the drawing, the lure according to my invention has a wooden body 10 which is substantially shaped like an egg. On the forward or heavy end of the body 10 an eye screw 11 is screwed into the body 10 and a washer 12 is arranged between the eye of the screw and the body. The lure can then be fastened onto a fishing line 13 by means of a swivel 14.

A second eye screw 15 is screwed into the body 10 in the bottom portion thereof and adjacent its forward end. A second washer 16 is interposed between the eye of this screw and the body 10. A fish hook 17 is attached to and supported by the second eye screw 15 so that it can swing freely thereon.

Into the rear end of the body 10 a third eye screw 18 is screwed and a third washer 19 surrounds the neck portion 20 of this eye screw and is located on the body 10.

A spinner 21 is rotatably mounted on the neck portion 20 of the eye screw 18. This spinner is formed from a metal blank which is shown in Figure 2 and is shaped like a propeller.

A second fish hook 22 is fastened onto the eye of the third eye screw 18. To prevent this second fish hook from interfering with the free movement of the spinner 21 by being caught on it, but give the hook 22 liberty from some movement on the third eye screw 18, a guard 23 is provided. This guard is made from wire. The wire is first coiled around the neck portion 20 of the third eye screw 18 outside the spinner 21. From this coil 24 the wire extends rearwardly in a strand 25 on the rearward end of which a bight 26 is formed surrounding the stem of the second fish hook 22.

The lure according to my invention being made from wood floats on the surface of the water. When it is pulled in or retrieved, the spinner starts to rotate, setting up a commotion on the surface of the water, which will attract fish from a great distance.

Having described my invention I claim as new and desire to secure by Letters Patent:

A fishing lure having a wooden body including an eye screw in the rear end of the body, a spinner rotatably mounted on the eye screw, a fish hook secured to the eye of the eye screw and a guard to prevent the fish hook from interfering with the free movement of the spinner, the guard consisting of a wire coil surrounding the neck of the eye screw, the wire extending rearwardly from the coil and, the rear portion of the wire being in the form of a bight and surrounding the stem of the fish hook.

WAINO E. HIMOTTU.

REFERENCES CITED

The following references are of record in the file of this patent:

UNITED STATES PATENTS

| Number | Name | Date |
|---|---|---|
| 1,871,387 | Pflueger | Aug. 9, 1932 |
| 1,920,935 | Khoenle | Aug. 1, 1933 |
| 2,131,858 | Ledrich | Oct. 4, 1938 |